US010216880B1

(12) United States Patent
Liu et al.

(10) Patent No.: US 10,216,880 B1
(45) Date of Patent: Feb. 26, 2019

(54) SYSTEMS AND METHODS FOR POWER EFFICIENT FLOP CLUSTERING

(71) Applicant: CADENCE DESIGN SYSTEMS, INC., San Jose, CA (US)

(72) Inventors: Wen-Hao Liu, Cedar Park, TX (US); Zhuo Li, Austin, TX (US); Charles Alpert, Austin, TX (US); Brian Wilson, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 119 days.

(21) Appl. No.: 15/212,002

(22) Filed: Jul. 15, 2016

(51) Int. Cl.
*G06F 17/50* (2006.01)

(52) U.S. Cl.
CPC ...... *G06F 17/5045* (2013.01); *G06F 2217/62* (2013.01); *G06F 2217/78* (2013.01)

(58) Field of Classification Search
CPC .... G06F 17/5072; G06F 2217/62; G06F 1/10; G06F 2217/84; G06F 2217/78; G06F 1/06; G06F 17/5077; G06F 1/08; G06F 1/12
USPC .......... 716/108, 113–114, 118–119, 132–135
See application file for complete search history.

(56) References Cited

U.S. PATENT DOCUMENTS

| 6,536,024 | B1 * | 3/2003 | Hathaway | G06F 1/10 716/113 |
| 8,826,211 | B1 * | 9/2014 | Sood | G06F 17/5077 716/113 |
| 9,135,375 | B1 * | 9/2015 | Sood | G06F 17/50 |
| 2011/0260764 | A1 * | 10/2011 | Kitahara | G06F 17/505 327/202 |

* cited by examiner

*Primary Examiner* — Nghia M Doan
(74) *Attorney, Agent, or Firm* — Eric L. Sophir; Dentons US LLP

(57) ABSTRACT

Methods and systems of optimization of and Integrated Circuit (IC) design disclosed herein result in a power efficient clustering of circuit devices. The methods may depart from the conventional geometric clustering using a nearest neighbor approach when wiring flops to local clock buffers. To reduce the number of clock-gaters, the methods in one embodiment use a grouping of flops wired to a common clock-gater to form nodes, which are then wired to the local clock buffers based on a load-balancing process. In another embodiment, the methods use a local cleanup process to rewire the nodes between neighboring clock buffers to further reduce the amount of clock-gaters.

20 Claims, 13 Drawing Sheets

SYSTEMS AND METHODS FOR POWER EFFICIENT FLOP CLUSTERING

TECHNICAL FIELD

This application relates generally to the field of optimizing electronic circuit designs, and more specifically systems, methods, and products for generating a more power efficient integrated circuit.

BACKGROUND

A semiconductor integrated circuit (IC) has a large number of circuit devices with complex interconnections. The placement and interconnection of the components of the IC may be facilitated with an Electronic Design Automation (EDA) tool, which allows an enormous flexibility in design and optimization of the IC. EDA technologies typically run on an operating system in conjunction with a microprocessor-based computer system or other programmable control system.

As a part of the IC design, a clock distribution network or a clock tree has to be constructed. The clock distribution network may indicate how a global clock signal is distributed from one or more signal sources to the circuit devices that require a clock signal. The circuit devices that require the clock signal may be memory devices such as flip-flops. As the clock signal may have to be carried a large number of flip-flops distributed throughout the IC, a clock distribution network may consume a significant amount of power. Being a consumer of a significant amount of power, a clock distribution network may be a candidate for design optimization for improving the power efficiency of the IC. ICs that can operate drawing less power are highly desirable in view of the rising demand of "untethered" devices, such as smartphones and tablets. A more power efficient IC may give a better battery life without a corresponding reduction in the functionality.

The distribution of the clock signal to various flip-flops scattered throughout the IC may be facilitated by clock buffers, which may act as nodes in the clock distribution network. A clock buffer may function as a source of the clock signal to a local cluster of flip-flops. Conventionally, each flip-flop may be assigned to the nearest clock buffer using a "nearest neighbor" approach. However, the flip-flops may not be distributed evenly throughout the IC. Therefore, a clock buffer close to a cluster with a high density of flip-flops may have to drive a heavier load compared to a clock buffer close to a sparsely populated cluster. For example, a cluster of 1000 flip-flops may be closer to, and therefore assigned to, a first clock buffer; and a cluster of 20 flip-flops may be closer to, and therefore assigned to, a second clock buffer. The first clock buffer connected to a larger number of flip-flops may need more wiring, more sub-buffers, and/or other circuit components to guarantee that the clock signal reaches all 1000 flip-flops simultaneously or near-simultaneously. The additional circuit components and wiring may translate into higher power consumption by the IC. On the other hand, the second clock buffer driving the smaller cluster may have latent power, and thus more flip-flops could be connected to the second clock buffer without increasing the power required.

The nearest neighbor approach may also sometimes defeat the purpose of a power reduction technique called "clock-gating." Clock-gating uses circuit devices, sometimes called clock-gaters wired between tapping-points and clusters of flip-flops. Under designer specified conditions, a clock-gater may not provide the clock signal received from the respective tapping-point to the cluster of flip-flops wired to the clock-gater. In other words, the clock-gater may turn off the respective cluster of flip-flops if the cluster is not required for certain operations. Such turning off allows the IC to save power that would have been consumed by the cluster had it not been "gated" from the clock signal. The conventional nearest neighbor approach may warrant that the cluster of flip-flops wired to the same clock-gater be broken. For example, a first set of flip-flops in the cluster may be closer to a first clock buffer and a second set may be closer to a second clock buffer. To accommodate for the nearest neighbor assignment, an identical clock-gater may have to be generated (or the clock-gater may have to be "cloned") so that each of the first set and second set may be wired to identical clock-gaters. The cloning is required to maintain the integrity of the original design that has a clock-gater wired to each of the first and second sets. However, the clock-gaters themselves need a lot a power, and therefore, cloning the clock-gaters may increase the power consumption by the IC.

What is therefore needed is a system that can depart from conventional nearest neighbor approach to reduce the aforementioned imbalance in the assignment of flip-flops for designing a more power efficient IC. What is also needed is a system that can depart from the conventional nearest neighbor approach to minimize the number of cloned clock-gaters for designing a more power efficient IC. What is also needed is a system that can track the global distribution and connections of various circuit devices and determine when it is appropriate to depart from the nearest neighbor approach.

SUMMARY

Methods and systems disclosed herein address the above issues and may further provide a number of other benefits as well. Methods and systems of an electronic circuit design optimization system disclosed herein result in an improved, power efficient clustering of sequential logic devices (collectively referred to as "flops").

In an embodiment, a computer-implemented method comprises receiving, by a computer, a netlist file comprising a plurality of device records of a plurality of devices for a circuit design, the plurality of devices comprising a plurality of flops, a plurality of tapping-points, and a plurality of clock-gaters; generating, by the computer, from a first set of flops containing at least one of the plurality of flops wired to a first clock-gater according to the netlist file, a first subset of flops based upon a threshold boundary that defines the first subset of flops; determining, by the computer, based upon the plurality of device records of the netlist file, a first force value associated with the first subset of flops and a first tapping-point, and a second force value associated with the first subset of flops and a second tapping-point; and in response to the computer determining that the first force value exceeds the second force value: updating, by the computer, in the netlist file, the device records of the first subset of flops to indicate that the first subset of flops is wired to the first tapping-point; and in response to the computer determining that the second force value exceeds the first force value: updating, by the computer, in the netlist file, the device records of the first subset of flops to indicate that the first subset of flops is wired to the second tapping-point.

In another embodiment, a system for circuit design comprises one or more computers comprising a non-transitory machine-readable media configured to store a netlist file comprising a plurality of device records of a plurality of devices for a circuit design, the plurality of devices comprising a plurality of flops, a plurality of tapping-points, and a plurality of clock-gaters; and a computer of the one or more computers, the computer coupled to the non-transitory machine-readable media storing the netlist file and comprising a processor configured to: generate, from a first set of flops containing at least one of the plurality of flops wired to a first clock-gater according to the netlist file, a first subset of flops based upon a threshold boundary that defines the first subset of flops; determine, based upon the plurality of device records of the netlist file, a first force value associated with the first subset of flops and a first tapping-point, and a second force value associated with the first subset of flops and a second tapping-point; and in response to determining that the first force value exceeds the second force value: update, in the netlist file, the device records of the first subset of flops to indicate that the first subset of flops is wired to the first tapping-point; and in response determining that the second force value exceeds the first force value: updating, in the netlist file, the device records of the first subset of flops to indicate that the first subset of flops is wired to the second tapping-point.

In an embodiment, a computer-implemented method comprises receiving, by a computer, a netlist file comprising a plurality of records of a plurality of devices for a circuit design, the plurality of devices comprising a plurality of flops and a plurality of tapping-points; identifying, by the computer, in the netlist file, a first flop and first set of one or more tapping-points within a threshold distance from the first flop; determining, by the computer, a respective force value between the first flop and each of the tapping-points in the first set of one or more tapping-points, wherein the respective force value is based upon the distance from the first flop to the respective tapping-point, and the number of flops wired to the respective tapping-point; and in response to the computer determining that the first flop has the greatest force with a first tapping-point in the first set of one or more tapping-points: updating, by the computer, in the netlist file, the device record of the first flop, the device record indicating the first flop is wired to the first tapping-point.

It is to be understood that both the foregoing general description and the following detailed description are exemplary and explanatory and are intended to provide further explanation of the subject matter as disclosed and as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
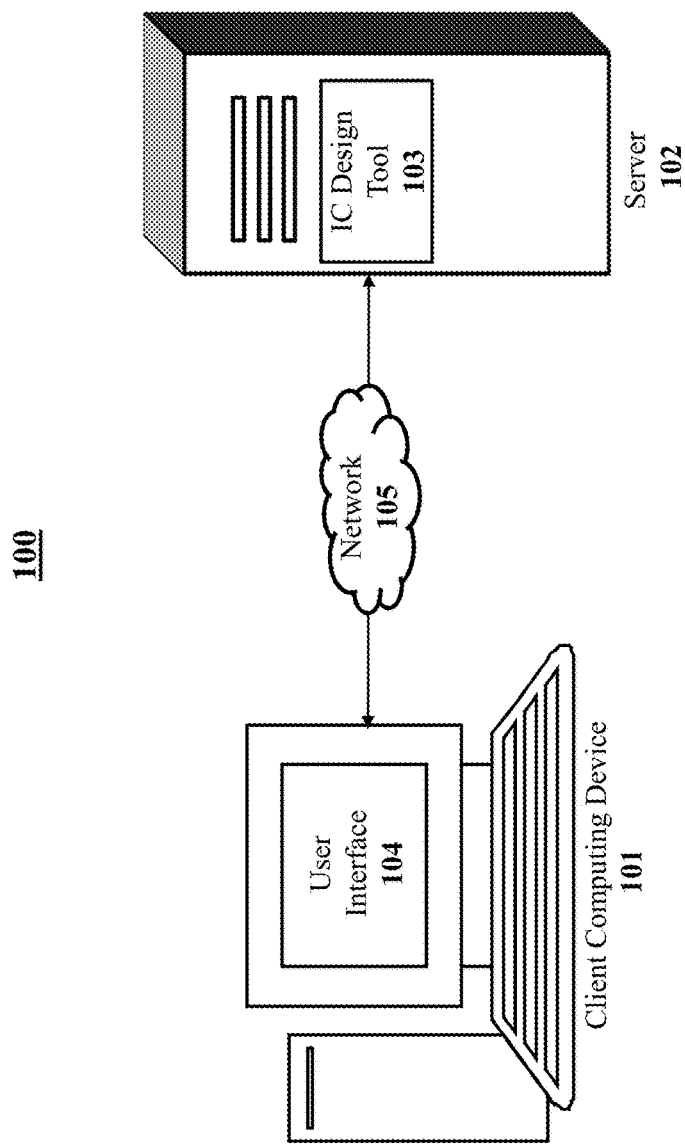
FIG. 1 is a schematic diagram illustrating a system, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Modern day integrated circuits (ICs) may include sequential logic circuits (also known as finite state machines). The output of a sequential logic circuit may not only depend upon the present value of the input signals, but also may depend upon the sequence of past inputs. In contrast, the output of a combination logic circuit is a function of only the present input. Therefore, a sequential logic circuit may include memory devices, such as registers, configured to store the past inputs. The memory devices may further be configured to store inputs and/or outputs of the combination logic portions of the sequential logic circuit.

The sequential logic circuits in an IC may be synchronous. Synchronous circuits are driven by a clock signal. The clock signal may generally resemble a square wave with a transition between binary values of "0" and "1" at regular intervals. The transition of the clock signal from "0" to "1" is known as the "rising edge" of the clock and the transition of the clock signal from "1" to "0" is known as the "falling edge" of the clock. Circuit devices using the clock signal for synchronization may be active at the rising edge, the falling edge, or at both the rising and falling edges.

Synchronous circuits may use synchronous memory devices, such as flip-flops and registers. Such memory devices are referred to hereinafter as plural "flops" or a singular "flop." A flop is a clocked binary storage device. For example, the flop may store either a "0" or a "1." The binary value stored in the flop (also known as the "state" of the flop) may change on the appropriate transition of the clock signal. For example, in a "leading-edge triggered" flop, the binary value stored in the flop changes when the clock signal transitions from "0" to "1." Similarly, in a "trailing-edge triggered" flop, the binary value stored in the flop changes when the clock signal transitions from "1" to "0." In some flops, the stored binary value may change in each of the transitions of the clock signal from "0" to "1" and from "1" to "0." What is stored in the flop after a transition of the clock signal may depend upon the flop data inputs and what was stored in the flop prior to the transition. The binary value in the flop may change asynchronously too, for example, by using an asynchronous reset signal.

The IC may also include clock distribution networks, also known as "clock trees." A clock distribution network may be driven by a global clock signal and may include clock buffers to provide one or more signals to the plurality of flops distributed throughout the IC. A clock buffer (sometimes referred to as "tapping-point") may receive a global clock signal, amplify the signal, and provide the clock signal to one or more flops. The tapping-point may also provide the clock signal to other sub-buffers downstream. The clock distribution network, for example, may be a symmetric H-tree, and the tapping-points may be at the nodes and/or leaves of the symmetric-H tree. The clock distribution network however may be asymmetric or may have any other configuration provided that the global clock signal arrives at the tapping-points simultaneously or near-simultaneously. Non-limiting examples of a clock-distribution network may include: a fishbone structure having a clock-spine connected to clock-signal distribution branches; and a clock-mesh structure or a partial clock-mesh structure. One having ordinary skill in the art would appreciate that the aforementioned clock-distribution networks are merely exemplary, and that other clock-distribution networks may be used.

The IC may also include clock-gaters used as power-saving devices. A clock-gater may be connected between a tapping-point and a cluster of flops. The clock-gater may be configured to "gate" and not provide the clock signal to the cluster of flops under designer specified conditions. In other words, when appropriate, the clock-gater may turn off the cluster of flops to save power that would have been wasted by the cluster. The clock-gater may comprise one or more combination logic devices, such as an AND gate. For the AND gate, one of the inputs may be the clock signal from the tapping-point the clock-gater is wired to, and the other inputs may come from other portions of the circuit. If any of the other inputs is "0" in the clock-gater, the AND gate will generate a "0" output regardless the state of the clock signal. Therefore, the clock transitions arriving at the tapping-points may not be propagated to the cluster of flops effectively shutting off the cluster. It should be appreciated that a clock-gater is not limited to a single logic gate. Instead, a clock-gater may comprise any number of logic gates, which may include a plurality of combination logic devices, such as: multiplexers, AND gates, OR gates, NAND gates, NOT gates, NOR gates, XOR gates, inverters, buffers, and/or other types of logic gates.

Clock-gaters in an IC may further be arranged in a hierarchical structure that includes multiple hierarchical levels of clock-gaters. For example, the IC may include one or more leaf-level or level_zero clock-gaters which are directly wired to the flops. The level_zero clock-gaters may be wired to hierarchically higher level_one clock-gaters, and so on and so forth. The clock-gater at the highest hierarchical level or root-level may be wired to a tapping-point. The hierarchical structure may allow the IC to selectively shut down clusters of various sizes to conserve dynamic power consumed by the IC.

Embodiments herein recite a method and a system for generating a more power-efficient clustering of a plurality of flops. The embodiments of the present disclosure may be implemented in electronic design automation (EDA) technologies, such as a custom Integrated Circuit (IC) design system having a GUI-based or text-based, layout editor software routine running program code to assist a circuit designer to generate, implement, and optimize customized electronic circuit design. Although the present disclosure can be implemented to run with custom design systems, it is understood that the present disclosure is not limited thereto and may also be implemented with other known or later developed EDA technologies or hardware description languages capable of generating and manipulating various circuit devices to produce and optimize electronic layout.

The EDA layout software and computing devices may access a design database hosted on one or more computing devices configured store records of the design elements of the IC. The design database may enforce a standard data record format, such as an OpenAccess (OA) database, allowing for interoperability support between disparate electronic design software tools. The EDA layout software and the associated database may generate, store, and/or reformat data according to any number of proprietary and/or standardized formats and protocols. The EDA layout software may include various tools (e.g., executable routines, associated software programs) configured to synthesize hardware description language, such as VHDL and Verilog, to generate a netlist file or a set of records representing a netlist. Embodiments of the system and method disclosed herein may depart from the conventional "nearest neighbor" approach to generate a more power-efficient clustering of flops. The conventional nearest neighbor approach considers only distance when determining which flops should be associated with which tapping-points of an IC. However, to achieve the most power-efficient circuit, the "nearest neighbor" may not be the only consideration when determining whether a flop should be wired to a certain tapping-point. In contrast to such single-factor conventional approaches, in the embodiments described herein, a system may calculate a multi-factor force value for associating flops and tapping-points. For instance, the force value between a tapping-point and a flop may be based upon the number of flops that have already been wired to the tapping-point and the distance between the tapping-point and the flop. In some implementations, this load-balancing approach may further depend upon a lower and/or upper bound on the number of flops that could be wired to a tapping-point. The load-balancing approach described herein is equally applicable to both ICs with clock-gaters and ICs without clock-gaters.

Embodiments disclosed herein may also reduce the number of clock-gaters in the IC. For various timing, synchronization, and efficiency purposes, flops may be organized into clusters, where each flop is wired to a clock-gater device, which, in turn, may be wired to a tapping-point. Oftentimes, because the conventional "nearest neighbor" approach seeks to wire each particular flop of the IC to the nearest tapping-point to the particular flop, the nearest neighbor approach removes the particular flop from a cluster of flops wired to a single clock-gater in order for the particular flop to be wired to the nearest tapping-point. When such a cluster is broken in order to facilitate the nearest neighbor connection between a flop and a tapping-point, the clock-gater of that cluster has to be cloned to maintain the integrity of the original IC design. Cloning too many clock-gaters may cause inefficiencies or may slow down the performance of the IC; particularly, when clock-gaters are cloned to facilitate the nearest-neighbor connections for a relatively small number of flops. In the embodiments described herein, the system may create groups within the flop clusters wired to the same clock-gater. The group may be created based on a threshold distance. The flops are then wired and rewired as a group to the tapping-points, which may reduce the number of cloned clock-gaters compared to the conventional technique of wiring the flops to the tapping-points individually based solely on the "nearest neighbor" consideration.

Embodiments disclosed herein may also include a local cleanup process. During the local cleanup, the system may determine that a first tapping-point may be connected to a first clock-gater and a neighboring second tapping-point may be connected to a second clock-gater, wherein the first and second clock-gaters may be identical to each other. After a determination that the first and second clock-gaters are identical to each other, the system determines the number of flops connected to each of the first and second clock-gaters. If the system determines that the number of flops connected to the first clock-gater is significantly higher than the number of flops connected to the second clock-gater, the system may delete the second clock-gater and rewire the one or more nodes wired to the second clock-gater to the first clock-gater. In doing so, the system may reduce the number of clock-gaters in the IC, thereby making the IC more power efficient.

Although the embodiments disclosed herein are described in terms of circuit devices such as flops and tapping-points, these embodiments apply equally to the standard "cell" based design of the IC. In other words, each of the flops and combination logic devices described herein may be described to as individual cells in an IC design. Furthermore, although the embodiments described mention that circuit devices may be "wired" to each other, the term "wired" and variants thereof should not be construed to mean only a physical wiring. These terms may also refer to a logical connection between the circuit components, where the physical connection or wiring may occur during the IC fabrication using an IC design.

FIG. 1 illustrates an electronic design automation system 100, according to an exemplary embodiment. The electronic design automation system 100 may include any number of computing devices; the exemplary embodiment may include a client 101 and a server 102. The client 101 may be connected to the server 102 via hardware and software components of one or more networks 105. A network 105 may also connect various computing devices with databases or other components of the system 100. Examples of the network 105 include, but are not limited to, Local Area Network (LAN), Wireless Local Area Network (WLAN), Metropolitan Area Network (MAN), Wide Area Network (WAN), and the Internet. The communication over the network 105 may be performed in accordance with various communication protocols, such as Transmission Control Protocol and Internet Protocol (TCP/IP), User Datagram Protocol (UDP), and IEEE communication protocols.

A client device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client computing device 101 may be configured to communicate with one or more servers 102 of the system 100 through one or more networks 105, using wired and/or wireless communication capabilities. A user interface 104 may include a Graphical User Interface (GUI) that renders an interactive, graphical representation of an IC design, layout, schematic, or other logical representation, the IC that is being designed and optimized using a design tool 103. The GUI 104 may provide interactive elements, such as graphical representations of IC design elements (e.g., flops, clock-gaters), for a user to manipulate the IC design layout. In some embodiments, the user interface 104 may include a text based interface allowing the user to enter manual commands for designing and optimizing the IC.

A server 102 may be accessible to a client 101 via one or more networks 105. The server 102 may be any computing device comprising a processor and other computing hardware configured to execute an IC design tool 103 software module (e.g., EDA design software) that may analyze and optimize an IC design. In operation, using a client device 101 to access a design tool 103 hosted on a server 102 over a network 105, a circuit designer may interact with the IC design tool 103, through a number of input devices of the client device 101, such as by inputting a selection as with a mouse or inputting a request as with a keyboard. The IC design tool 103 may generate any number of graphical interface 104 responses based on the inputs received from the client device 101, and then send the data back to the client device 101 to be rendered on the GUI 104.

The server 102 may execute one or more component software modules of the IC design tool 103 software program, which may be a software program that allows users (e.g., engineers, circuit designers) to design and optimize circuit designs through software modules. The IC design tool 103 may provide users with interactive design interfaces 104 for designing an IC and the various design elements, execute automated optimization processes, and execute automated layout-generation processes. The server 102 may comprise, or may be in networked-communication with, non-transitory machine-readable media configured to store a netlist of IC design elements, which may be a machine-readable computer file or a design database containing one or more records of design elements (e.g., circuit devices) of the IC design. In operation, the IC design tool 103 may analyze and optimize the design elements of the netlist associated with the IC design. Non-limiting examples of circuit devices may include memory devices (e.g., flops), combination logic gates (e.g., AND, OR, NOT, NOR, NAND, XOR), and multiplexers, among others. The netlist may also include records of a plurality of nets. The nets may be the records associated with the wires interconnect the plurality of circuit devices. The netlist (e.g., netlist file, design database records) may store the positions of the circuit devices in a fabrication die of the IC, and the positions of tapping-points in the die of the IC. In some embodiments, the positions may be expressed in terms of X, Y coordinates with respect to a Cartesian abscissa and ordinate defined in the die. In other embodiments, the positions may be expressed in terms of polar coordinates. It should be understood that these coordinate systems are non-limiting upon how the system, software modules, and data storage elements may express the position of design elements on the die of the IC, as a designer or distinct software module may define or enforce a position referencing system for defining and referring the particular position of design elements in the die of the IC.

The exemplary system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities).

Figure 2:
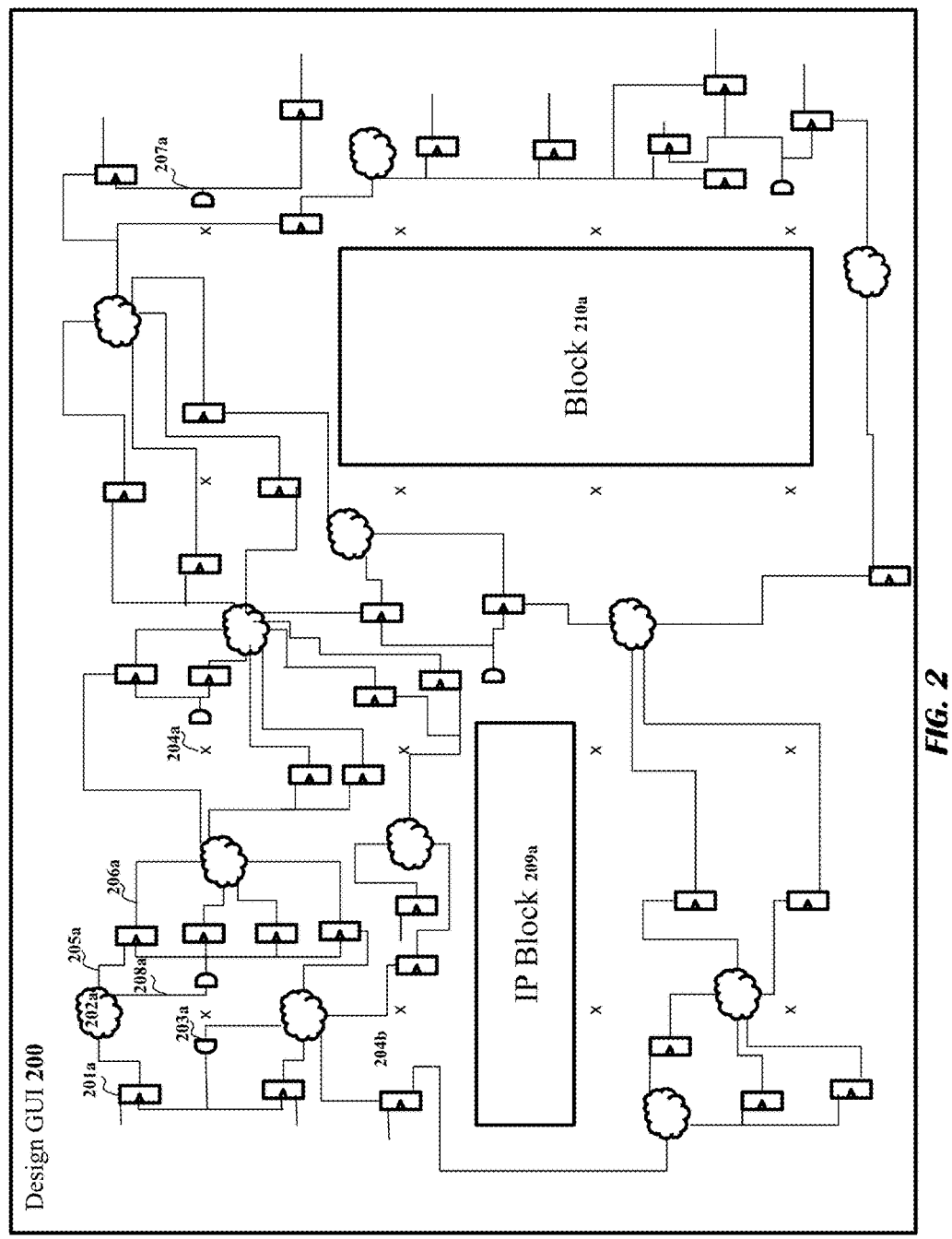
FIG. 2 is a schematic diagram showing a Graphical User Interface (GUI) rendering a simple IC configuration, according to an exemplary embodiment.

FIG. 2 shows an exemplary design GUI 200 generated by an IC design tool, where the design GUI 200 is generated based on data records of a netlist, which may be machine-readable computing file or design database. The circuit configuration shown by the GUI 200 comprises a plurality of circuit devices 201, 202, 203, 204, which, in the exemplary embodiment, may include flops 201, combination logic clusters 202, clock-gaters 203, tapping-points 204, and/or any other type of circuit device that may be placed on an IC to enhance or control the functionality of an IC. The combination logic clusters 202 may include a combination of various combination logic devices (e.g., AND gates, OR gates, NAND gates, XOR gates).

The GUI 200 also shows a plurality of wires 205, 206, 207, 208 as indicated by the nets of the netlist stored in a design database. The wires 205, 206, 207, 208 may include: input wires 205 to the flops 201, output wires 206 from the flops 201, clock signal wires 207 from the clock-gaters 203 to the flops, input wires 208 to the clock-gaters 203 from combination logic clusters 202, and/or any other type or path of wires between devices of the IC design or from devices of the IC to external devices.

The circuit configuration may also include intellectual property (IP) blocks 209. The IP blocks 209 may be predefined collections of circuitry that are often patented and licensed from a third party, and thus cannot or should not be altered but must remain a design consideration on the GUI 200. In some embodiments, the design software may be prohibited from altering the circuit devices of the IP blocks 209 or altering the connections of various circuit devices in the IP blocks 209 during a design or optimization process. In some cases, the circuit configuration may also include other predefined blocks 210, which may be predetermined sets of design elements (e.g., circuit devices) set aside by the designer or other user for critical circuit components whose connections may not be altered by the design software during the optimization process. In operation, the IC design tool may prohibit a user from manipulating these predefined blocks 209, 210 using the GUI 200; while the IC design tool may not manipulate any underlying data records containing data for any predefined blocks 209, 210 in the netlist. In some embodiments, changes to data of the predefined blocks 209, 210 must be made directly to the netlist through a software program of a prior design step, or through some alternative design process of the software design tool, aside from the exemplary design GUI 200.

Tapping-points 204 may be configured to provide a clock signals to flops 201 and/or a clock-gaters 203. Tapping-points 204 may correspond to "leaves" and/or "nodes" of a symmetric H-tree driven by a global clock signal (not shown in FIG. 2). The symmetric H-tree used for the layout of the tapping-points 204 shown in FIG. 2 is merely exemplary, and any configuration of the tapping-points 204 is valid for an IC as long as the placement of the tapping-points 204 allows the global clock signal to arrive at each of the tapping-points 204 simultaneously or near-simultaneously.

To drive the IC as represented by the circuit configuration in the exemplary design GUI 200, each of the flops 201 may be provided a clock signal. In operation, the flops 201 may receive a clock signal directly from tapping-points 204 or indirectly from clock-gaters 203. In some embodiments, the design elements of the IC may further comprise a combination of additional or alternative circuit devices, such as clock buffers, repeaters, and/or any other components associated with a clock signal, situated between tapping-points 204 and flops 201.

Figure 3A:
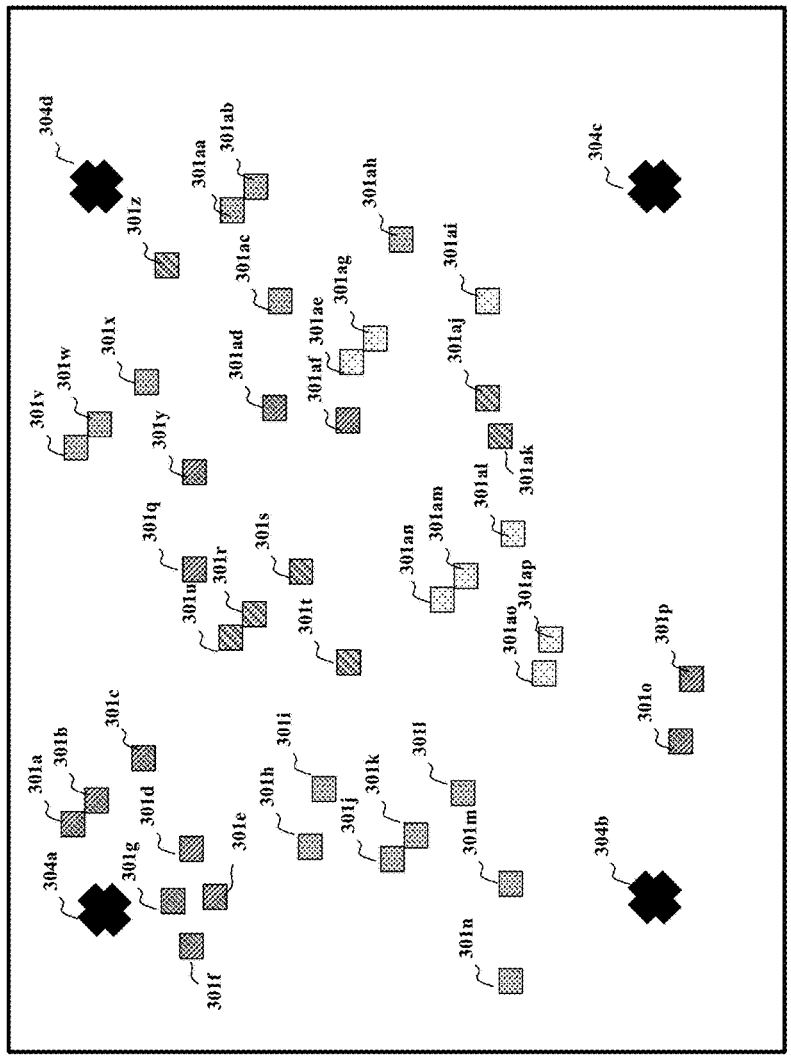
FIG. 3A is a schematic diagram showing a GUI rendering a plurality of tapping points and a plurality of flops, according to an exemplary embodiment.

FIG. 3A shows an exemplary design GUI 300*a* generated by an IC design tool during a design and optimization process. In operation, the IC design tool may render a circuit configuration of the IC on the design GUI 300*a* based on a netlist containing records of circuit devices and interconnections of the IC currently being designed or optimized; the netlist may be a machine-readable computer file or records of a design database containing data corresponding to the design elements of the IC. The exemplary design GUI 300*a* shows a circuit configuration that includes a plurality of flops 301 and a plurality of tapping-points 304. The plurality of flops 301 may be wired to a plurality of clock-gaters (not shown). In the exemplary design GUIs 300*a-g*, shown in FIGS. 3A-G, flops 301 wired to a common clock-gater are indicated by the same fill-pattern. For example, in FIG. 3A, the exemplary design GUI 300*a* displays the flops 301*a*, 301*b*, 301*c*, 301*d*, 301*e*, 301*f*, 301*g*, 301*o*, 301*p*, 301*q*, 301*y*, 301*ad*, 301*af* as having the same fill pattern, and therefore are wired to the same clock-gater according to the underlying netlist data.

The IC design tool may query database records to identify the flops 301 wired to common clock-gaters. For example, in the exemplary embodiment, the IC design tool may identify a first set of flops 301*a*, 301*b*, 301*c*, 301*d*, 301*e*, 301*f*, 301*g*, 301*o*, 301*p*, 301*q*, 301*y*, 301*ad*, 301*af* as wired to a first common clock-gater. The IC design tool may further identify a second set of flops 301*h*, 301*i*, 301*j*, 301*k*, 301*l*, 301*m*, 301*n*, 301*v*, 301*w*, 301*x*, 301*aa*, 301*ab*, 301*ac*, 301*ah* as wired to a second common clock-gater. The IC design tool may further identify that a third set of flops 301*r*, 301*s*, 301*t*, 301*u*, 301*z*, 301*aj*, 301*ak* as wired to a third common clock-gater. The IC design tool may further identify that a fourth set of flops 301*ae*, 301*ag*, 301*ai*, 301*al*, 301*am*, 301*an*, 301*ao*, 301*ap* as wired to a fourth clock-gater.

The IC design tool may query the database records to determine that the clock-gaters may be arranged in a hierarchical structure. For example, the IC design tool may determine based upon the database records that the first, second, third, fourth common clock gaters may be at level-_zero or leaf-level of a hierarchical clock-gater tree. The IC design tool may further determine that the first clock-gater may be connected to a first level_one clock gater, hierarchically above the first, second, third, and fourth common clock-gaters. The IC design tool may also determine that the second, third, and fourth common clock-gaters may be connected to a second level_one clock-gater, also hierarchically above the first, second, third, and fourth common clock-gaters.

Figure 3B:
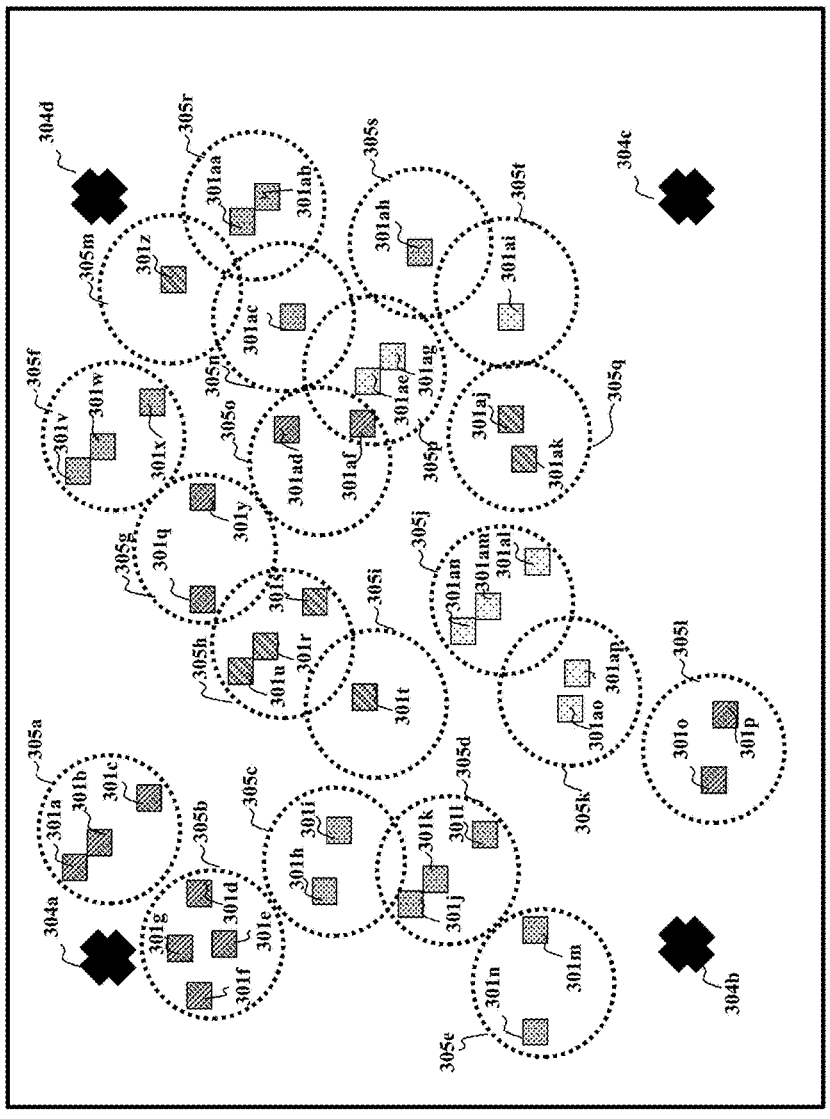
FIG. 3B is a schematic diagram showing an updated GUI rendering groupings of the plurality of flops into nodes, according to an exemplary embodiment.

For one or more of the first, second, third, and fourth set of flops 301, the IC design tool may identify and update the corresponding database records of certain flops 301 to indicate a grouping of flops 301 within the respective set of flops 301. Based on the update to the database records, the IC design tool may generate an exemplary design GUI 300b that shows groupings of flops 301. As shown in FIG. 3B, the IC design tool may group the flops 301 to generate nodes 305 including one or more flops 301. For example, as seen the exemplary design GUI 300b, the IC design tool has grouped the flops 305a, 305b, 305c to generate a node 305a.

The IC design tool may generate the group of flops 301 based upon a threshold distance. For example, the IC design tool may select flops 301a, 301b, 301c that are within a threshold distance of each other to generate a node 305a. However, the IC design tool may determine that flop 301g, although wired to the same clock-gater as the flop 301b, may not be within the threshold distance from either of the flops 301a, 301b, 301c and therefore may determine that flop 301g is not to be included in the node 305a. In some embodiments, the IC design tool may determine that there are no flops 301 wired to the same clock-gater within a threshold distance of one of the flops 301. For example, as shown in the design GUI 300b, flop 301ai does not have flops 301 connected to the same clock-gater within a threshold distance. For such situation, the IC design tool may generate a node 305t that includes a single flop 301ai. Furthermore, the IC design tool may not use the flops 301 wired to different clock-gaters to generate the groups 305 even if such flops 301 are within the threshold distance. For example, flop 301af may be within a threshold distance from flop 301ae. However, the IC design tool may determine that flop 301af is wired to a different clock-gater than the flop 301ae. Therefore, even though flop 301af may be within the threshold distance from the flop 301ae, the IC design tool may not include the flop 301af in the node 305p at least for the reason that flop 301af is wired to a different clock-gater than flop 301ae.

In some embodiments, the threshold distance is set by a designer. In some embodiments, the threshold distance is determined by the IC design tool based on parameters such as die size, number of tapping-points, number of clock-gaters, number of flops, and margin of error allowed for clock skew. In some embodiments, the threshold distance is dynamically determined by the IC design tool. In some embodiments, the various regions of the circuit may have different threshold distances. For example, in the circuit configuration shown by the design GUI 300b, the threshold distance in the vicinity of tapping-point 304d may be different from the threshold distance in the vicinity of tapping-point 304a.

The aforementioned grouping of flops may constitute a level_zero grouping of flops. In other words, the IC design tool may generate nodes 305 from groups of flops that are wired to the same level_zero clock-gater. In other words, nodes 305 may constitute level_zero nodes. The IC design tool may generate level_one nodes of flops 301 by grouping the flops connected to different level_zero clock-gaters but a common level_one clock-gater. For example, the IC design tool may generate a first level_one node by grouping the first set of flops 301a, 301b, 301c, 301d, 301e, 301f, 301g, 301o, 301p, 301q, 301y, 301ad, 301af. The IC design tool may generate a second level_one node by grouping the second set of flops 301h, 301i, 301j, 301k, 301l, 301m, 301n, 301v, 301w, 301x, 301aa, 301ab, 301ac, 301ah. The IC design tool may generate a third level_one node by grouping the third set of flops 301r, 301s, 301t, 301u, 301z, 301aj, 301ak and the fourth set of flops 301ae, 301ag, 301ai, 301al, 301am, 301an, 301ao, 301ap. As detailed herein, the first level_one node may be wired to the first level_one clock-gater and the second and third level_one nodes may be wired to the second level_one clock-gater. The IC design tool may generate the level_one nodes based upon a level_one threshold distance, which may be set by a designer or may be dynamically determined by the IC design tool.

Although the IC design tool may generate nodes at different levels of the hierarchically arranged clock-gater structure, the embodiment including generation of level_zero nodes 305 been detailed below for the ease of explanation. It should be appreciated by one ordinarily skilled in the art that the embodiment described herein may equally apply to higher level nodes.

Figure 3C:
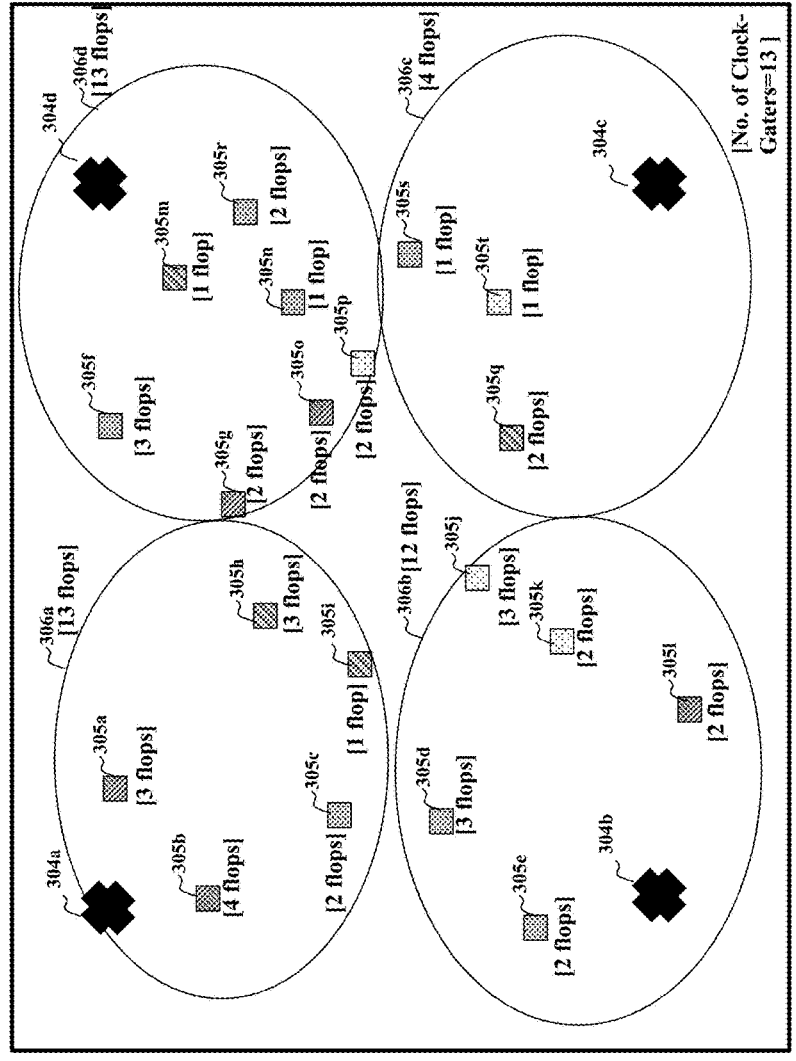
FIG. 3C is a schematic diagram showing an updated GUI rendering the clustering of nodes, according to an exemplary embodiment.

FIG. 3C shows an exemplary design GUI 300c generated by the IC design tool based on the grouping of flops 301. The exemplary design GUI 300c is shown to be rendering the nodes 305 and not the individual flops 301 within the nodes 305.

The IC design tool may then update the database records of each of the nodes 305 to indicate that each of the nodes 305 has been wired to its nearest tapping-point 304 to form clusters 306. The exemplary design GUI 300c is further based on the update to form the clusters 306 by the IC design tool. For example, the exemplary GUI 300c shows that nodes 305a, 305b, 305c, 305h, 305i have been wired to the first tapping-point 304a to form a first cluster 306a. The exemplary GUI further shows that the nodes 305d, 305e, 305j, 305k, 305l have been wired to the second tapping-point 304b to form a second cluster 306b. The exemplary GUI 300c also shows that nodes 305q, 305s, 305t have been wired to the third tapping-point 304c to form a third cluster 306c. The exemplary GUI 300c further shows that nodes 305f, 305g, 305m, 305n, 305o, 305p, 305r have been wired to the fourth tapping-point 304d to form a fourth cluster 306d.

The IC design tool may generate one or more clones of the clock-gaters based on the wiring of nodes 305 to the tapping points 304 to form the clusters 306. For example as shown in the design GUI 300c, the IC design tool has wired the nodes 305a, 305b to the first tapping point 304a and the node 305l to the second tapping point 304b. However, as indicated by the fill patterns, all of the nodes 305a, 305b, 305l were wired to the same first clock gater before the IC design tool wired the nodes 305a, 305b, 305l to the tapping points 304a, 304b. To maintain the integrity of the original design, the IC design tool may generate cloned first clock-gater that is identical to the first clock-gater, and update the database records accordingly. In some instances, the IC design tool may determine that a first distance between the first clock-gater and the first tapping point 304a is greater than a second distance between the first clock-gater and the second tapping point 304b. In such instances, the IC design tool may wire the node 305l to the second tapping point 304b via the first clock-gater and wire the nodes 305a, 305b, 305c to the first tapping point 304a via the cloned first clock-gater and update the database records accordingly. In some instances, the IC design tool may determine that the second distance is greater than the first distance. In such instances, the IC design tool may wire the nodes 305a, 305b, 305c to the first tapping point 304a via the first clock gater and wire the node 305l to the second tapping point via the cloned first clock-gater and update the database records accordingly. The total number of clock-gaters in the circuit configuration shown in the exemplary GUI 300c is thirteen.

After the initial wiring, the IC design tool may implement an exemplary iterative load-balancing method. For the iterative load-balancing method, the IC design tool may determine a force value between each of the tapping-points 304 and each of the nodes 305. The force value between the nodes 305 and the tapping-points 304 may convey the power consumption efficiency that can be derived from wiring the nodes 305 and the tapping-points 304. For example, if the force value between the node 305b and the first tapping-point 304a is larger than the force value between the node 305b and the second tapping-point 304b, wiring the node 305b to the first tapping-point 304a may result in the IC circuit consuming lower power compared to a circuit wherein the node 305b has been wired to the second tapping-point 304b.

In some embodiments, the IC design system may determine the force value between each of the tapping-points 304 and the nodes 305 based upon the weight value of the tapping-points 304 and the distance between the tapping-points 304 and the nodes 305. The IC design system may determine the weight values of the tapping-point 304 based upon the number of flops 301 already wired to the tapping-points 304; a tapping-point 304 wired to fewer flops 301 may have a larger weight value than a tapping-point 304 wired to more flops 301. For example, according to the database records of the exemplary embodiment, the first tapping-point is wired to nodes 305a, 305b, 305c, 305h, 305i each including three, four, two, four, and one of the flops 301 respectively. Therefore, thirteen of the flops 301 have been wired to the first tapping-point 304. In contrast, the second tapping-point 304b has been wired to nodes 305d, 305e, 305j, 305k, 305l each including three, two, three, two, and two of the flops 301 respectively. Therefore, a total twelve of the flops 301 have been wired to the second tapping-point 304b. Based on the number of flops 301 that have been wired to each of the first tapping-point 304a and the second tapping-point 304b, the IC design system may determine that the second tapping 304b has a higher weight value than the first tapping-point 304a.

The force value of tapping-points 304 may increase with the increment in the respective weight value of the tapping-points 304. For example, a node 305i may be substantially equidistant from each of the first tapping-point 304a and the second tapping-point 304b. As the second tapping-point 302b has a higher weight value compared to the first tapping-point 304a, the IC design system may determine that the force value between the second tapping-point 304b and the node 305i may be higher than the force value between the first tapping-point 304a and the node 305i.

The force value between the tapping-points 304 and the nodes 305 may further be based upon the distance between the tapping-points 304 and the nodes 305. For example, the distance between the first tapping-point 304a and a node 305a is less than the distance between the first tapping-point 304a and a node 305i. Therefore, the IC design tool may determine that the force value between the first tapping-point 304a and the node 30a is higher than the force value between the first tapping-point 304a and the node 305i.

The IC design tool may implement the exemplary load-balancing method based upon an additional requirement of a maximum and/or minimum number of flops 301 to be wired to each of the tapping-points 304. For example, each of the tapping-points 304 may have a lower bound of nine and an upper bound of twelve. In other words, each of the tapping-points 304 may have to be wired to nine of the flops 301 but may not be wired to more than twelve of the flops 301. In some implementations, the lower and upper bounds may be specific to each of tapping-points 304. For example, if the first tapping-point 304a is close to a critical segment of the circuit, a designer may specify that the first tapping-point 304a should have a lower upper bound compared to the second tapping-point 304b that may not be close to the critical segment of the circuit.

At each iteration of the exemplary load-balancing process, the IC design tool may determine a force value between each of the nodes 305 and each of the tapping-points 304 based at least weight value of the tapping-points 304 and distance between the nodes 305 and the tapping-points 304. The IC design tool may then wire each of the nodes 305 to the tapping-points 304 that exert the maximum amount of force on the respective nodes 304, and update the database records accordingly. Furthermore, IC design system may not violate the upper bound and lower bound of flops 301 for each the tapping-points 304.

Figure 3D:
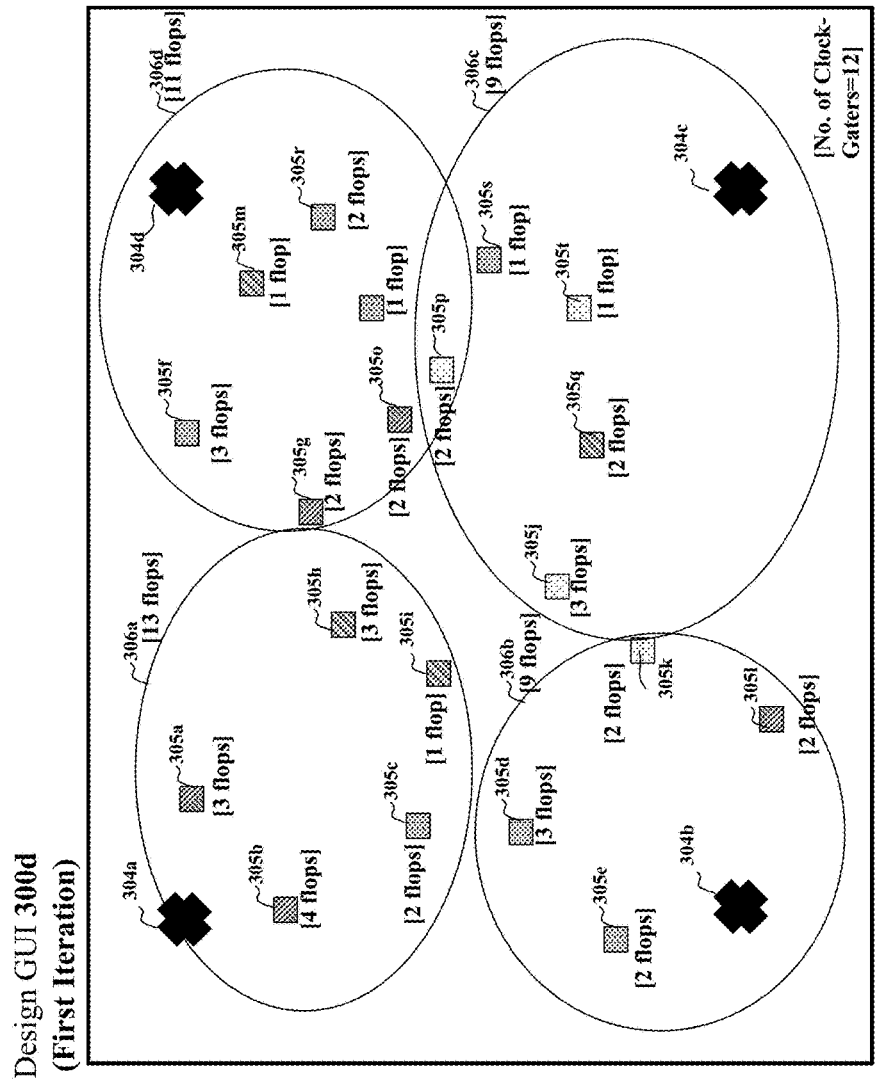
FIG. 3D is a schematic diagram showing an updated GUI rendering a first-iteration of an exemplary load-balancing method, according to an exemplary embodiment.

For example, FIG. 3D shows the exemplary GUI 300d that may be generated by the IC design tool during an exemplary first iteration of the load-balancing method. As indicated by the exemplary GUI 300d, the IC design tool has maintained the wiring of the first cluster 306a, the first tapping-point 304a is wired to the nodes 305a, 305b, 305c, 305c, 305h, 305i. However, the IC design tool has changed each of the second cluster 306b, the third cluster 306c, and the fourth cluster 306d, the IC design tool has moved the node 305j from the second cluster 306b to the third cluster 306c and node 305p from the fourth cluster 306d to the third cluster 306c. In other words, the IC design tool has decoupled node 305j from the second tapping-point 304b and wired the node 305j to the third tapping-point 304c, and the decoupled node 305p from the fourth tapping-point 304d and wired the node 305p to the third tapping-point. After the first iteration the first cluster 306a contains thirteen of the flops 301, the second cluster 306b contains the nine of the flops 301, the third cluster 306c contains nine of the flops 301, and the fourth cluster 306d contains eleven of the flops 301. However, the IC design tool may determine that the clustering of flops 301 after the first iteration has a cluster-size violation, the first tapping-point 304a is wired to thirteen of the flops, higher number than the upper bound of twelve. The total number of clock-gaters in the circuit configuration shown by the exemplary GUI 300d is twelve.

Figure 3E:
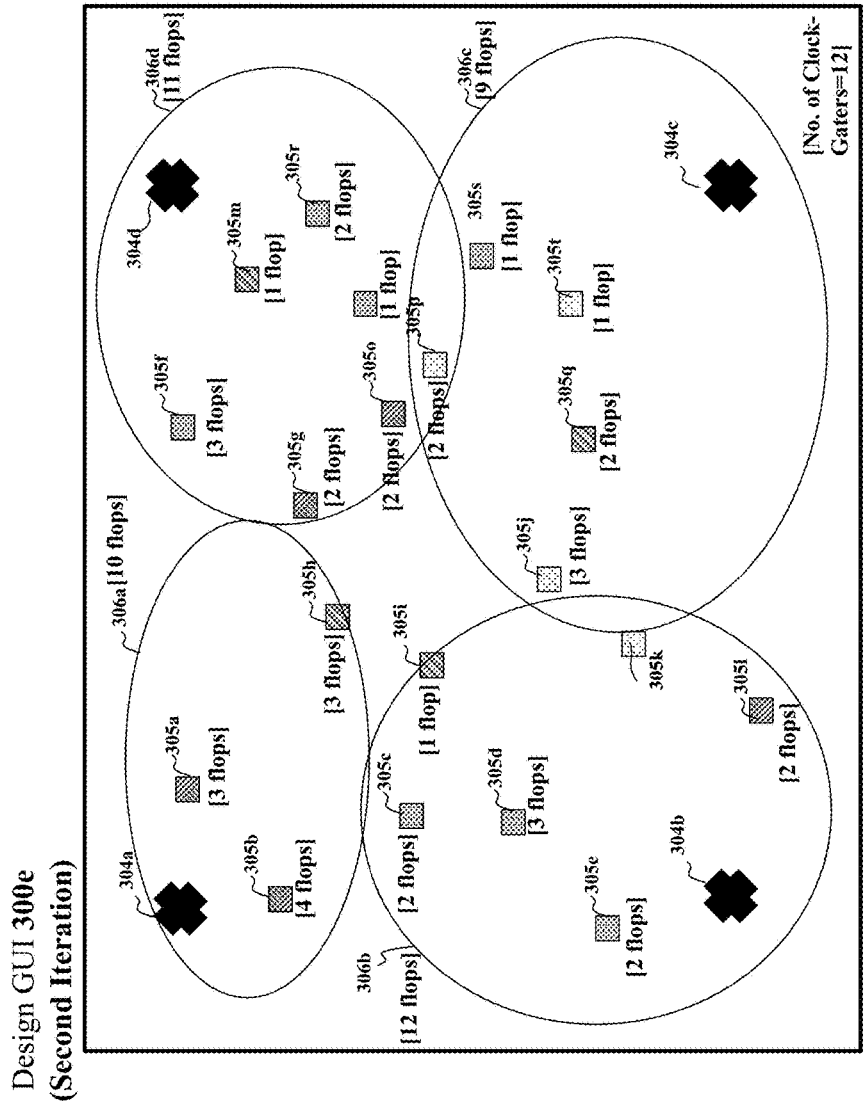
FIG. 3E is a schematic diagram showing an updated GUI rendering a second iteration of an exemplary load balancing method, according to an exemplary embodiment.

FIG. 3E shows an exemplary GUI 300e generated by the IC design tool during a second iteration of the load-balancing method. During the second iteration, the IC design tool has maintained the wiring of the third cluster 306c and the fourth cluster 306b. However, the IC design has changed the wiring configuration of each of the first cluster 306a and the second cluster 306b, the IC design tool has moved 305c from the first cluster 306a to the second cluster 306b. In other words, during the second iteration, the IC design tool has decoupled the node 305c from the first tapping-point 304a and rewired the node 305c to the second tapping-point 304b.

After the second iteration, the IC design tool may determine that the size of each of the clusters 306 shown in exemplary design GUI 300e does not violate the upper bound and lower bound. The first cluster 306a contains ten of the flops 301, the second cluster 306b contains twelve of the flops 301, the third cluster 306c contains nine of the flops 301, and the fourth cluster 306d contains twelve of the flops 301, the number of flops in all of the clusters 306 within the upper bound of twelve of the flops 301 and the lower bound of nine of the flops 301. The total number of clock-gaters after the second iteration is twelve.

Figure 3F:
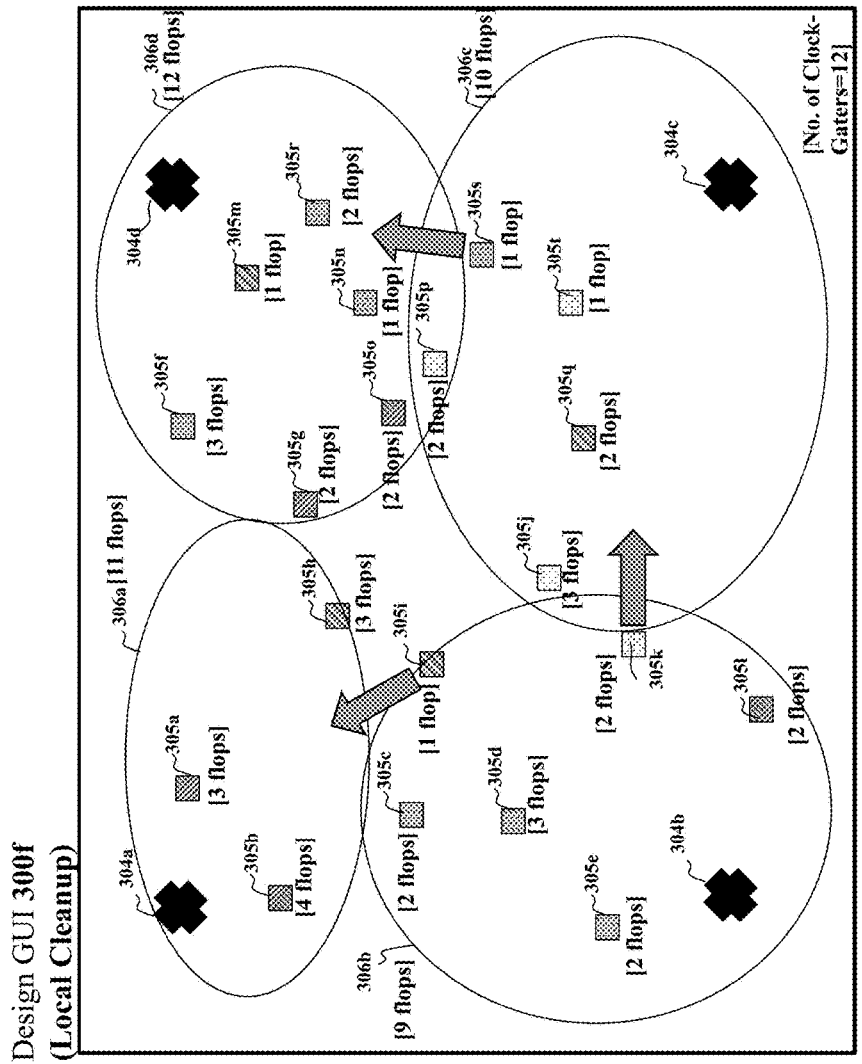
FIG. 3F is a schematic diagram showing an updated GUI rendering an exemplary local cleanup method, according to an exemplary embodiment.

In some embodiments, the IC design tool may implement an exemplary local cleanup method. FIG. 3F shows an exemplary GUI 300f that the IC design tool may generate during operation of the local cleanup method. The exemplary GUI 300f shows a circuit configuration including the tapping-points 304, the nodes 305 containing flops 301, and the clusters 306 associated with the tapping-points 304. For the local cleanup process, the IC design tool may query the records of the neighboring tapping-points 304 to identify the nodes 305 included in the clusters 306 associated with the tapping-points 304. Furthermore, the IC design tool may identify the nodes 305 wired to the tapping-points 304 via common clock-gaters. For example, in the circuit configuration shown in the exemplary GUI 300f, the IC design tool may determine that the nodes 305f, 305n, 305r in the fourth cluster 306d are wired to the fourth tapping-point 304d via a first clock-gater, as indicated by the same fill pattern of the nodes 305f, 305n, 305r. Moreover, the IC design tool may determine that node 305s in the third cluster 306c is connected to the third tapping-point 304c via a second clock-gater identical to (or a "clone" of) the first clock-gater, as indicated in the exemplary GUI 300f, which shows the node 305s having the same fill pattern as the nodes 305f, 305n, 305r. The IC design system may then query the records to determine the number of flops 301 included each of the nodes 305f, 305n, 305r, 305s.

For the circuit configuration shown in the exemplary GUI 300f, the node 305f includes three of the flops 301, the node 305n includes one of the flops 301, the node 305r includes two of the flops 301, and the node 305s includes one of the flops 301. Therefore, the total number of flops 301 wired to the fourth tapping-point 304d via the first clock-gater is five, and the total number of flops 301 wired to the third tapping-point 304c via the second clock-gater that is identical to the first clock-gater is one. The IC design system may then determine the difference or the ratio between the number of flops 301 wired to the fourth tapping-point 304d via the first clock-gater and the number of flops wired to the third tapping-point 304c via the second clock-gater. Upon determining that the difference or ratio is above a threshold, the IC design tool may update the database record to indicate that node 305s has been decoupled from the third tapping-point 304c, that the second clock-gater has been deleted, and that the node 305s has been wired to the fourth tapping-point 304d via the first clock-gater. However, prior to updating of the record, the IC design tool may check whether the decoupling the node 305s from the third tapping-point 304c and rewiring of the node 305s to the fourth tapping-point 304d will violate the upper and lower bound of the flops 301 that can be wired to the tapping-points 304c, 304d. The IC design tool may update the record to indicate the decoupling and rewiring only if the IC design tool determines that there is no violation of the upper and lower bounds.

In some embodiments, the IC design system may also determine the change in the radius of the third cluster 306c and the fourth cluster 306d as a result of decoupling the node 305s from the third tapping-point 304c and rewiring the node 305s to the fourth tapping-points 304d. The IC design system may update the record to indicate the decoupling and rewiring only if the IC design tool determines that there is no substantial change in the cluster radius of at least one of the third cluster 306c and the fourth cluster 306d. It should be appreciated that "cluster radius" should not be construed as limiting the shape of the clusters 306 to a circular or canonical geometry. Each of the clusters 306 may have an uneven or random shape, and the radius should refer to one or more dimensions of the shape of the cluster.

Based on the updates to the database records during the local cleanup process, the IC design tool may generate the exemplary GUI 300f, which indicates the rewiring of the node 305s from the fourth tapping-point 304d to the third tapping-point 306d. The exemplary GUI 300f also indicates the rewiring of node 305i from the second tapping-point 304b to the first tapping-point 304a and the rewiring of the node 305k from the second tapping-point 304b to the third tapping-point 304c. The total number of clock gaters in the database for the IC design, after the local cleanup, has been reduced to nine.

Figure 3G:
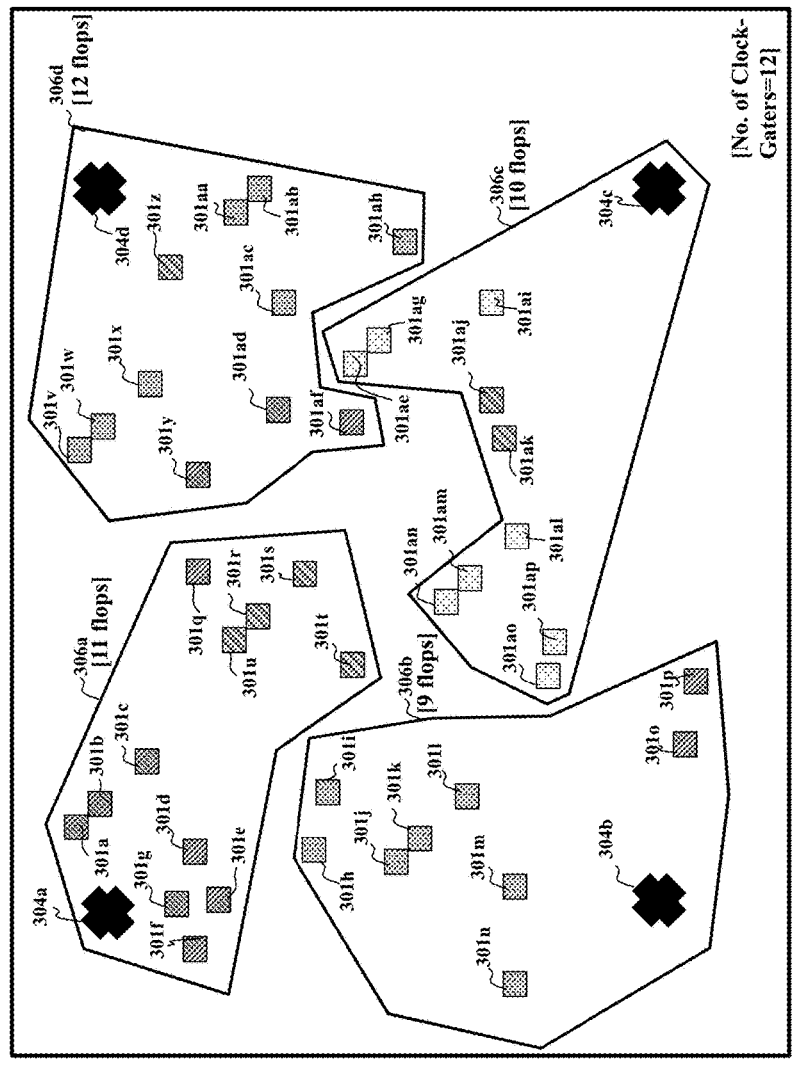
FIG. 3G is a schematic diagram showing an updated GUI rendering the clustering of flops after two iterations of the exemplary load-balancing and an exemplary local cleanup, according to an exemplary embodiment.

FIG. 3G shows an exemplary design GUI 300g generated by IC design tool after two iterations of the exemplary load-balancing process and the exemplary local cleanup process. After load-balancing and local cleanup, the IC design tool may update the database record to ungroup the nodes 305, therefore the exemplary GUI 300g generated by the IC design tool shows the flops 301 wired to the tapping points 304 and forming the clusters 306. Under similar circumstances, prior design tools using conventional design and optimization techniques, such as "nearest neighbor," may have generated comparatively more geometrically uniform clusters that would consume more power than the comparatively geometrically non-uniform clusters generated by the exemplary embodiments discussed herein, as shown in the exemplary design GUI 300g. For example, although the conventional methods may have generated geometrically uniform clusters, the clusters could have a load-imbalance at least due to a tapping point being wired a larger number of flops compared to another tapping point. Furthermore, the conventional methods may have generated a circuit configuration with a higher number of clock-gaters.

In order to achieve the load-balancing, the software design tool may execute the power efficient clustering process iteratively. During each iteration, the IC design tool may update records in the netlist file or design database to indicate the changes in wirings or connections between the plurality of circuit devices. In some embodiments, the update to the plurality of records may be after a batch of iterations. In some embodiments, the update to the plurality of records may be after the iterations have been completed.

In some embodiments, the IC design tool may output an updated netlist file indicating the updated wirings or connections. In other embodiments, the final output may be a text file that is able to be read by an EDA software tool or a computer system of an IC manufacturing facility.

Figure 4A:
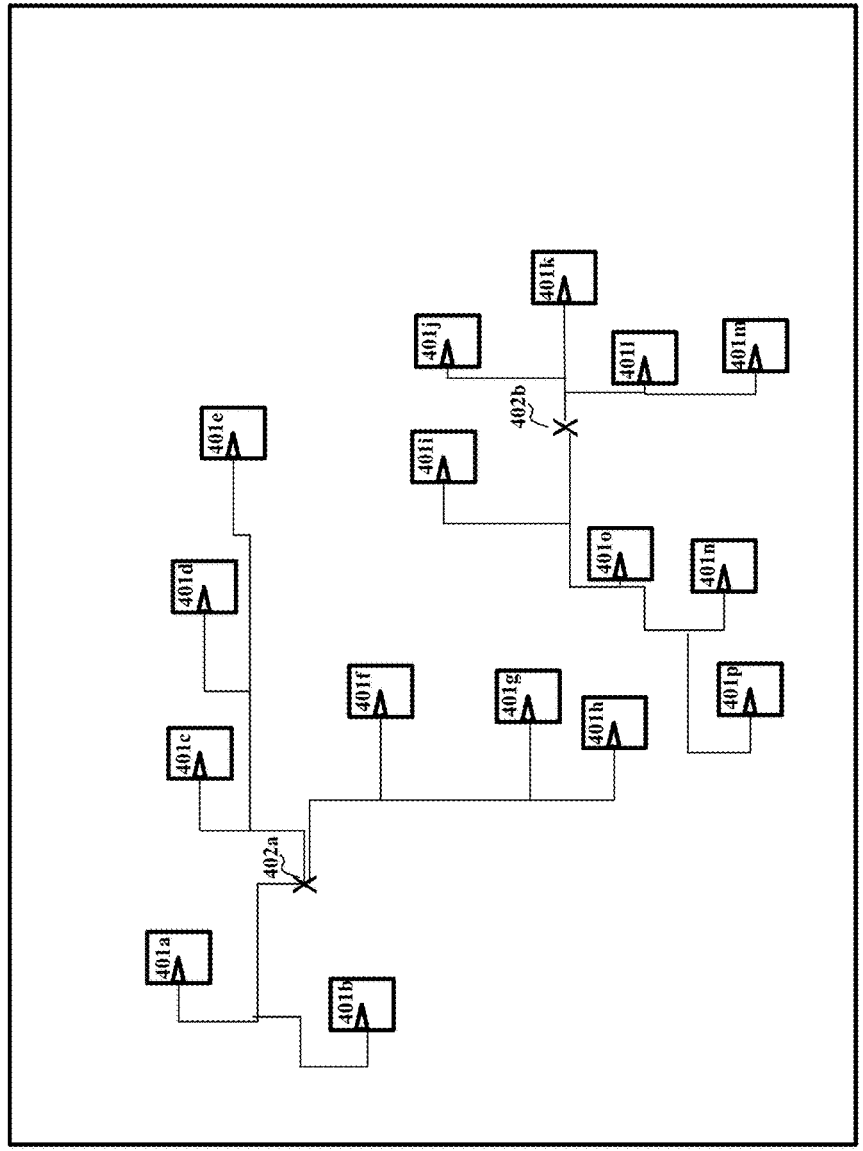
FIG. 4A is a schematic diagram showing a GUI rendering an exemplary wiring of flops to tapping points, according to an exemplary embodiment.

FIG. 4A shows a design GUI 400a generated by an IC design tool configured to execute an exemplary load-balancing method during design and optimization processes. In operation, the IC design tool may render a circuit configuration of the IC on the design GUI 400a based on a netlist containing records of circuit devices and interconnections of the IC currently being designed or optimized; wherein the netlist may be a machine-readable computer file or a design database. FIG. 4A shows the exemplary GUI 400a rendering the circuit configuration of the IC prior to the design software executing an iteration of the load-balancing process. In some instances, the GUI 400a may display an initial circuit configuration as indicated by an original netlist received by the IC design tool. In other instances, the GUI 400a may display an intermediate circuit configuration after the IC design tool has executed one or more load-balancing iterations. The software design software may render the circuit configuration on the design GUI 400*a* based on a query of a netlist file or design database storing records of circuit devices and interconnections of the IC being designed or optimized.

The circuit configuration includes tapping-points 402. The tapping-points 402 may be clock buffers configured to receive a global clock signal. The circuit configuration also includes flops 401. As shown in the GUI 400*a* of FIG. 4A, a first tapping-point 402*a* is wired to a first set of flops 401*a*-401*f*. Similarly, a second tapping-point 402*b* is wired to a second set of flops 401*g*-401*p*. The first set of flops 401*a*-401*f* wired to the first tapping-point 402*a* includes six flops, whereas the second set of flops 401*g*-401*p* wired to the second tapping-point 402*b* includes ten flops.

It should be understood that although a direct connection is shown between the tapping-points 402 and the respectively wired flops 401, there may be one or more circuit devices between the tapping-points 402 and the flops 401. For example, a clock-gater may be wired between the tapping-points 402 and the flops 401. Furthermore, other circuit devices, such as combination logic clusters and IP blocks, are not shown in the exemplary design GUI 400*a* for the sake of simplicity. In some embodiments, the flops 401 may be directly wired to the tapping points 402 without clock-gaters in between.

The imbalance in the number of flops 401 wired to the tapping-points 402 may lead to a less power-efficient circuit configuration. For example, the second tapping-point 402*b* may have a greater wirelength to ensure that the global clock signal received at the second tapping-point 402*b* reaches to the second set of flops 401*g*-401*p*. Furthermore, other circuit elements, such as clock sub-buffers, may be required to ensure that the global clock signal received at a second tapping-point 402*b* reaches the second set of flops 401*g*-401*p* simultaneously or near-simultaneously. In this exemplary embodiment, the first tapping-point 402*a* may have a latent capacity to accommodate more flops 401 without an adding more circuit elements. Moreover, the total wirelength may be reduced by rewiring some of the flops 401*g*, 401*h* in the second set of flops 401*g*-401*p* to the first tapping-point 402*a*.

Using the design data in the netlist (e.g., netlist file, design database), the IC design tool may determine a force value between each of the flops 401 and each of the tapping-points 402. The force value between two circuit devices, for example, a flop 401*f* and a first tapping-point 402*a* conveys the power consumption efficiency that can be derived from wiring the two circuit devices. For example, if the force value between the flop 401*f* and the first tapping-point 402*a* is larger than the force value between the flop 402*a* and the second tapping-point 402*b*, wiring the flop 401*f* to the first tapping-point 402*a* may result in the circuit consuming lower power compared to a circuit wherein the flop 401*f* has been wired to the second tapping-point 402*b*.

In some embodiments, the IC design tool may determine the force value between each of the tapping-points 402 and the flops 401 based upon the weight value of the tapping-points 402 and the distance between the tapping-points 402 and the flops 401. The IC design tool may determine the weight value of the tapping-point 402 based upon the number of flops 401 already wired to the tapping-points 402; a tapping-point 302 wired to fewer flops 401 may have a larger weight value than a tapping-point 402 wired to more flops 401. For example, according to a netlist file for the exemplary embodiment, the first tapping-point 402*a* may be wired to six flops 401*a*-401*f*, and the second tapping-point 402*b* may be wired to ten flops 401*g*-401*p*. Therefore, the IC design system may determine a higher weight value for first tapping-point 402*a* compared to the second tapping-point 402*b*. It should, however, be understood that the number of flops 401 already wired to the tapping-points 402 may be one of many factors to determine the weight value.

The force value of tapping-points 402 may increase with the increment in the respective weight value of the tapping-points 402. For example, a flop 401*f* is substantially equidistant from each of the tapping-points 402. As the first tapping-point 402*a* has a higher weight value compared to the second tapping-point 402*b*, the force value between the first tapping-point 402*a* and the flop 401*f* may be higher than the force value between the second tapping-point 402*b* and the flop 410*f*.

The force value between the tapping-points 402 and the flops 401 may further be based upon the distance between the tapping-points 402 and the flops 401. For example, the distance between the first tapping-point 402*a* and a flop 401*c* is less than the distance between the first tapping-point 402*a* and a flop 401*e*. Therefore, the force value between the first tapping-point 402*a* and the flop 401*c* may be higher than the force value between the first tapping-point 402*a* and the flop 401*e*.

The IC design tool may implement the exemplary load-balancing method based upon an additional requirement of a maximum and/or minimum number of flops 401 to be wired to each of the tapping-points 402. For example, each of the tapping-points 402 may have a lower bound of five and an upper bound of ten. In other words, each of the tapping-points 402 has to be wired to a minimum of five of the flops 401 but cannot be wired to than ten of the flops 401. In some implementations, the lower and upper bounds may be specific to each of tapping-points 402. For example, if first tapping-point 402*a* is close to a critical segment of the circuit, a designer may specify that the first tapping-point 402*a* should have a lower upper bound compared to the second tapping-point 402*b* that may not be close to the critical segment of the circuit.

At each iteration of the exemplary load-balancing method, the IC design tool may determine a force value between each of the flops 401 and each of the tapping-points 402 based at least upon the number of flops 401 wired to the respective tapping-points 402 and distance between the flops 401 and the respective tapping-points 402. Each of the flops 401 may be wired to one of the tapping-points 402 that exerts the maximum amount of force. Furthermore, the wiring of the flops 401 to the tapping-points 402 may not violate the upper bound and lower bound for the tapping-points 402.

In some embodiments, the determination of force value between each of the flops 401 each of the tapping-points 402 is based on a threshold distance. For example, if the second tapping-point 402*b* is not within a threshold distance from the first flop 401*a*, the IC design tool may not determine a force value between the first flop 401*a* and the second tapping-point 402*b*. In this way, the IC design tool may determine a force value between each of the flops 401 and a subset of the tapping-points 402. In other implementations, the IC design tool may determine the force value between each of the flops 401 and each of the tapping-points 402 in the IC design.

Figure 4B:
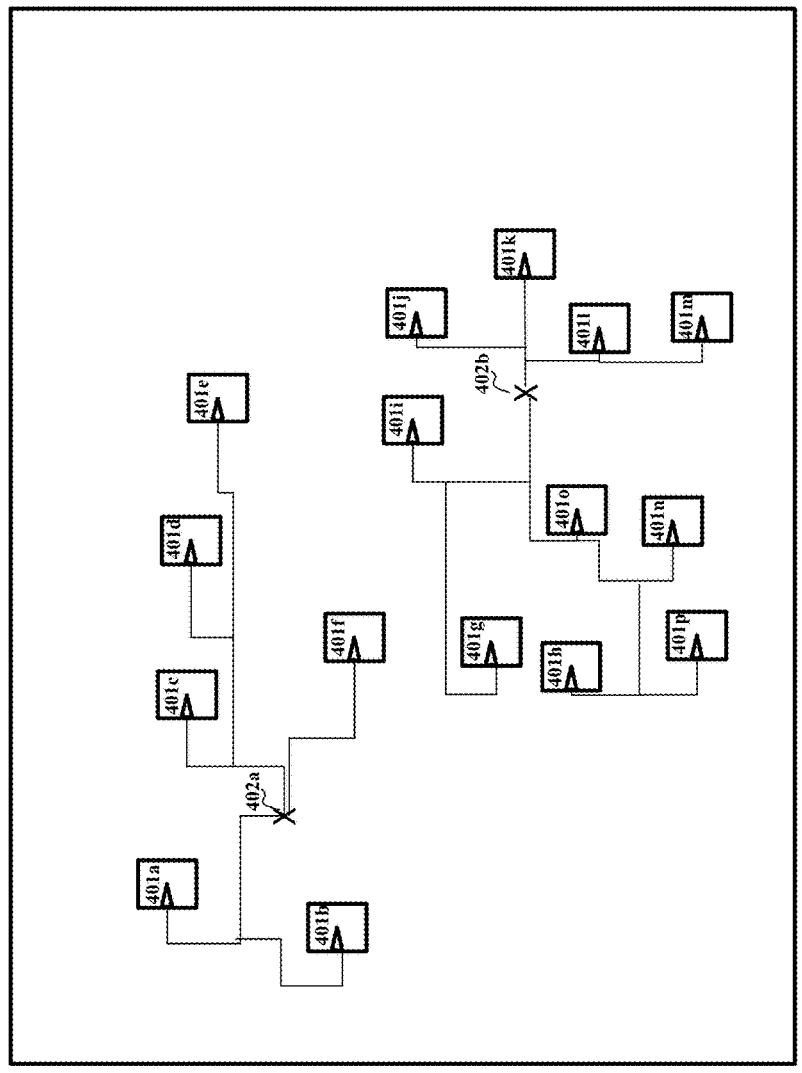
FIG. 4B is a schematic diagram showing an updated GUI rendering an exemplary rewiring of the flops to the tapping points based on an iteration of a load balancing method, according to an exemplary embodiment.

In FIG. 4A, for example, the first set of flops 401*a*-401*f* have been wired to the first tapping-point 402*a*; and flops 401*g*-401*p* have been wired to the second tapping-point 402*b*. In the current iteration, the IC design tool may determine that the force value between the first tapping-point 402a and each of the flops 401g, 401h is greater than the force value between the second tapping-point 402b and each of the flops 401g, 401h. Therefore, as seen in the exemplary GUI 400b in FIG. 4B, the IC design tool has flops 401g, 401h rewired to the first tapping-point 402a. Before the current iteration of FIG. 4B, the number of flops 401 wired to the first tapping-point 402a was six and the number of flops 401 wired to the second tapping-point 402b was ten. After this iteration, the circuit configuration is more load-balanced with eight of the flops 401 wired to each of the tapping-points 402.

During or after execution of the optimization iteration, the IC design tool may update the netlist according to the updated circuit configuration. For instance, in the exemplary embodiment, the IC design tool may update the records of the circuit devices in the design database for the rewired flops 401g, 401h to indicate that the rewired flops 401g, 401h were decoupled from the second tapping-point 402b and have been wired to the first tapping-point 402a.

Figure 5A:
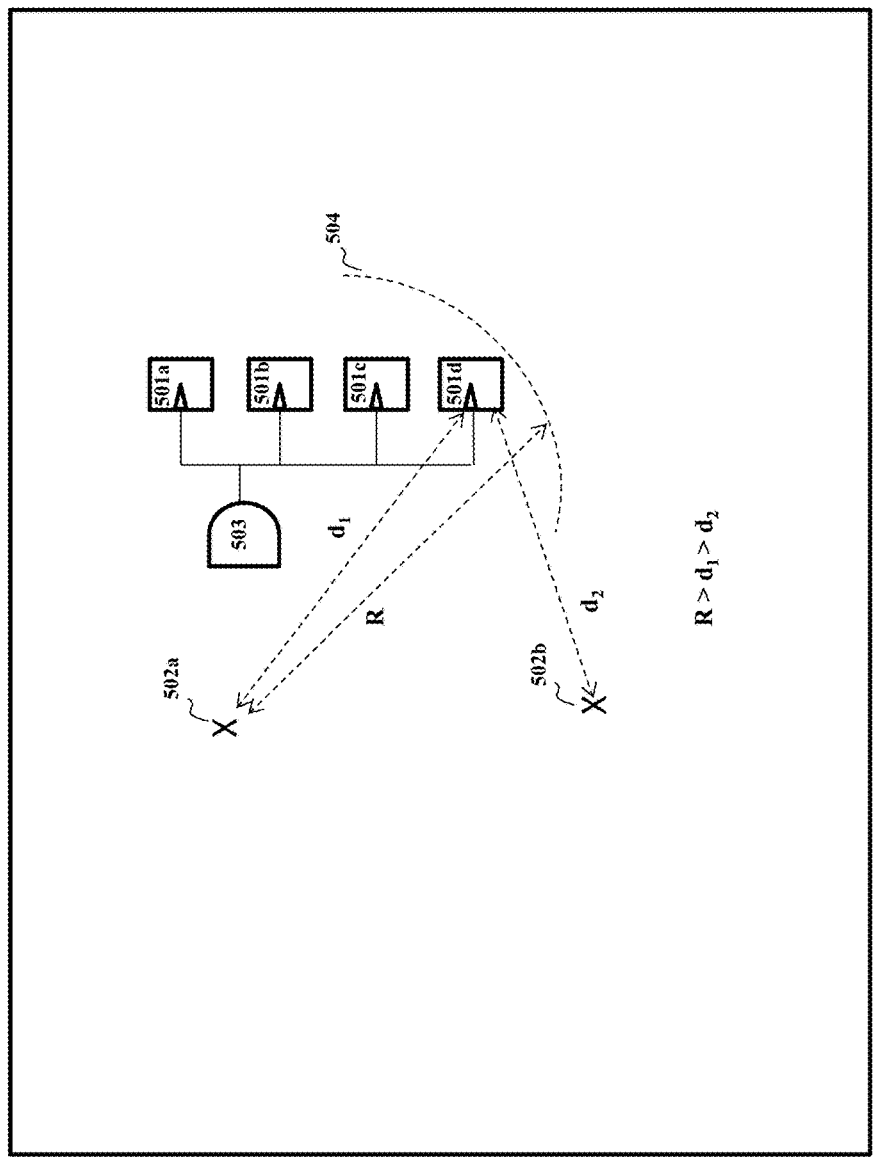
FIG. 5A is a schematic diagram showing a GUI rendering an exemplary wiring of flops to a clock-gater, according to an exemplary embodiment.

FIG. 5A shows an exemplary GUI 500a rendering a circuit configuration that includes flops 501, tapping-points 502, and a clock-gater 503. The rendered circuit configuration may be stored as records of the flops 501, the tapping-points 502, and the clock-gater 503 in a netlist, which may be a machine-readable computer file or a design database. Initially, the netlist records for the flops 501 and the tapping-points 502 may be based on a netlist received by an IC design tool.

The IC design tool may query the records associated with the flops 501, the tapping-points 502, and the clock-gater 503 to determine their positions in the die of an integrated circuit (IC). In some embodiments, the positions may be the X, Y coordinates stored in the system memory. Based on the position, the IC design tool may determine the distance between each of the flops 501 and the tapping-points 502. In some embodiments, the distance between the each of the flops 501 and the tapping-points 502 may be stored as a part of the record in the design database or netlist file. The distance may have been determined in the previous iteration of the method and stored in the design database or netlist file.

The IC design tool may determine that the distance between the each of the flops 501a, 501b, 501c and the first tapping-point 502a is less than the respective distances between each of the flops 501a, 501b, 501c and the second tapping-point 502b. The IC design tool may also determine that the distance between the fourth flop 501d and the first tapping-point 502a is greater than the distance between the fourth flop 501d and the second tapping-point 502b. In other words, the design software may determine that the fourth flop 501d is nearer to the second tapping-point 502b than the first tapping-point 502a. The IC design tool may also determine that all of the flops 501 are wired to the clock-gater 503.

The IC design tool may also query the design records of the netlist file or design database for a threshold distance associated with the first tapping-point 502a. In some embodiments, the threshold distance is set by the designer. In other embodiments the threshold distance may be dynamically determined by the IC design tool. In some embodiments, the first tapping-point 502a may have a different threshold distance than the second tapping-point 502b. In some embodiments, the threshold distance for the tapping-points 502 may be direction dependent.

Figure 5B:
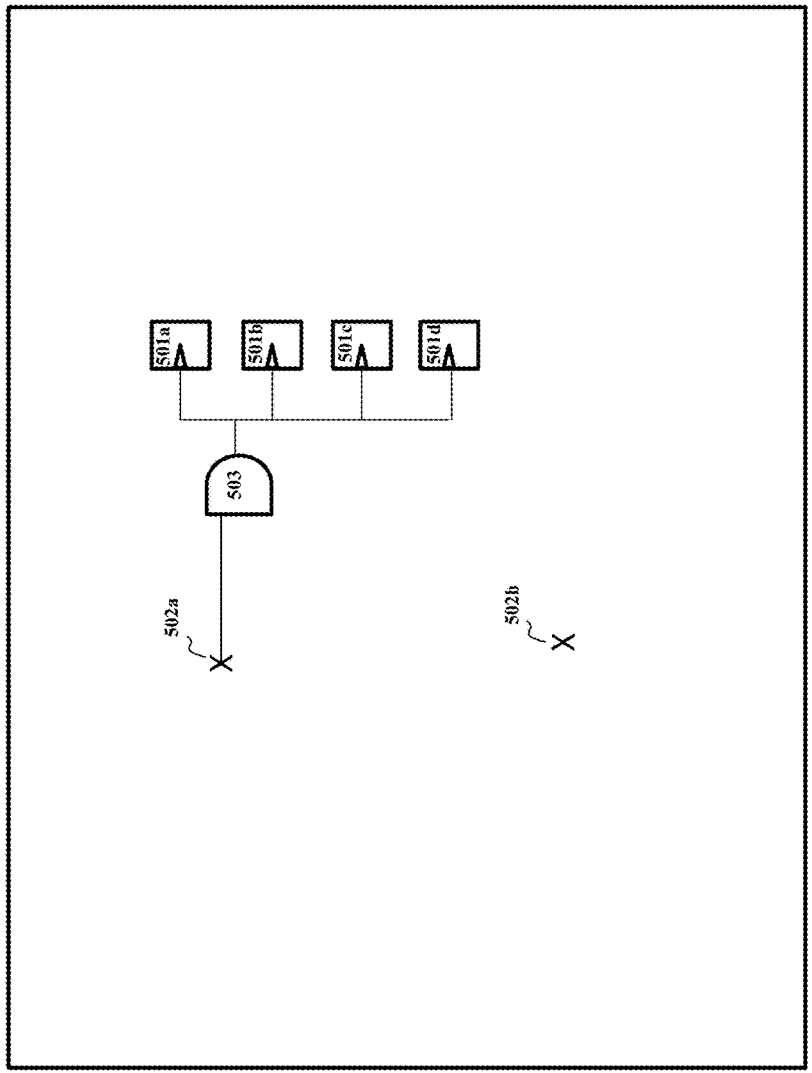
FIG. 5B is a schematic diagram showing an updated GUI rendering an exemplary wiring of the flops to a tapping point via the clock-gater, according to an exemplary embodiment.

The IC design tool may determine whether the fourth flop 501d is within the threshold distance of the first tapping-point 502a. If the IC design tool determines that the fourth flop 501d within the threshold distance from the first tapping-point 502a, the IC design tool may depart from the nearest neighbor approach and may not wire the fourth flop 501d to the nearest second tapping-point 502a. Instead, the IC design tool may wire the fourth flop to the first tapping-point 502a. In doing so, the IC design tool may avoid cloning the clock-gater 503, and therefore save some power in the operation of the circuit. As seen in exemplary GUI 500b in FIG. 5B, the circuit configuration uses a single clock-gater 503 and does not generate a clone of the clock-gater 503.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    receiving, by a computer, a netlist file comprising a plurality of device records of a plurality of devices for a circuit design, the plurality of devices comprising a plurality of flops, a plurality of tapping-points, and a plurality of clock-gaters;
    generating, by the computer, from a first set of flops containing at least one of the plurality of flops wired to a first clock-gater according to the netlist file, a first subset of flops based upon a threshold boundary that defines the first subset of flops;
    determining, by the computer, based upon the plurality of device records of the netlist file, a first force value associated with the first subset of flops and a first tapping-point, and a second force value associated with the first subset of flops and a second tapping-point;
    in response to the computer determining that the first force value exceeds the second force value:
        updating, by the computer, in the netlist file, the device records of the first subset of flops to indicate that the first subset of flops is wired to the first tapping-point;
    in response to the computer determining that the second force value exceeds the first force value:
        updating, by the computer, in the netlist file, the device records of the first subset of flops to indicate that the first subset of flops is wired to the second tapping-point; and
    causing, by the computer, a fabrication of an integrated circuit using the updated netlist file.

2. The method of claim 1, wherein the first force value is based upon a number of flops wired to the first tapping-point and a distance between the first subset of flops and the first tapping-point; and
    wherein the second force value is based upon the number of flops wired to the second tapping-point and a distance between the first subset of flops and the second tapping-point.

3. The method of claim 1, wherein the threshold boundary is based upon a distance between the first tapping-point and the second tapping-point.

4. The method of claim 1, wherein each of the first tapping-point and the second tapping-point is associated with a minimum and a maximum number of flops that can be wired to each respective tapping-point.

5. The method of claim 1, further comprising:
    determining, by the computer, based upon the plurality of device records of the netlist file, a first distance between the first clock-gater and the first tapping-point;
    determining, by the computer, based upon the plurality of device records of the netlist file, a second distance between the first clock-gater and the second tapping-point;
    in response to the computer determining that the first force value exceeds the second force value and that the first distance exceeds the second distance:
        generating, by the computer, in the netlist file, a device record of a cloned first clock-gater identical to the first clock-gater;
        updating, by the computer, in the netlist file, the device records of the first subset of flops and the cloned first clock-gater indicating that the first subset of flops is wired to the first tapping-point via the cloned first clock-gater; and
    in response to the computer determining that the first force value exceeds the second force value and that the second distance exceeds the first distance:
        updating, by the computer, in the netlist file, the device record of the first subset of flops indicating that the first subset of flops is wired to the first tapping-point via the first clock-gater;
    in response to the computer determining that the second force value exceeds the first force value and that the second distance exceeds the first distance:
        generating, by the computer, in the netlist file, a device record of a cloned first clock-gater identical to the first clock-gater;
        updating, by the computer, in the netlist file, the device records of the first subset of flops and the cloned first clock-gater indicating that the first subset of flops is wired to the second tapping-point via the cloned first clock-gater; and
    in response to the computer determining that the second force value exceeds the first force value that the first distance exceeds the second distance:

updating, by the computer, in the netlist file, the device record of the first subset of flops indicating that the first subset of flops is wired to the second tapping-point via the first clock-gater.

6. The method of claim 5, further comprising:
in response to the computer determining that a difference between a number of flops wired to the first tapping-point via the first clock-gater and the number of flops wired to the second tapping-point via the cloned first clock-gater is greater than a threshold value:
updating, by the computer, in the netlist file, the device record of each of the flops wired to the cloned first clock-gater indicating that each of the flops is no longer wired to the cloned first clock-gater and is wired to the first clock-gater; and
deleting, by the computer, in the netlist file, the device record of the cloned first clock-gater.

7. The method of claim 5, further comprising:
in response to the computer determining that a difference between a number of flops wired to the second tapping-point via the cloned first clock-gater and the number of flops wired to the first tapping-point via the first clock-gater is greater than a threshold value:
updating, by the computer, in the netlist file, the device record of each of the flops wired to the first clock-gater indicating that each of the flops is no longer wired to the first clock-gater and is wired to the cloned first clock-gater; and
deleting, by the computer, in the netlist file, the device record of the first clock-gater.

8. The method of claim 1, wherein the plurality of clock-gaters are arranged in a hierarchical clock-gater tree structure, and wherein the first clock-gater comprises a logic gate selected from the group consisting of: a multiplexer, an AND gate, an OR gate, a NOT gate, a NAND gate, a NOR gate, an XOR gate, an inverter, and a buffer.

9. A system for circuit design, the system comprising:
one or more computers comprising a non-transitory machine-readable media configured to store a netlist file comprising a plurality of device records of a plurality of devices for a circuit design, the plurality of devices comprising a plurality of flops, a plurality of tapping-points, and a plurality of clock-gaters; and
a computer of the one or more computers, the computer coupled to the non-transitory machine-readable media storing the netlist file and comprising a processor configured to:
generate, from a first set of flops containing at least one of the plurality of flops wired to a first clock-gater according to the netlist file, a first subset of flops based upon a threshold boundary that defines the first subset of flops;
determine, based upon the plurality of device records of the netlist file, a first force value associated with the first subset of flops and a first tapping-point, and a second force value associated with the first subset of flops and a second tapping-point;
in response to determining that the first force value exceeds the second force value:
update, in the netlist file, the device records of the first subset of flops to indicate that the first subset of flops is wired to the first tapping-point;
in response determining that the second force value exceeds the first force value:
updating, in the netlist file, the device records of the first subset of flops to indicate that the first subset of flops is wired to the second tapping-point; and
cause a fabrication of an integrated circuit using the updated netlist file.

10. The system of claim 9, wherein the first force value is based upon a number of flops wired to the first tapping-point, and a distance between the first subset of flops and the first tapping-point; and
wherein the second force value is based upon the number of flops wired to the second tapping-point, and a distance between the first subset of flops and the second tapping-point.

11. The system of claim 9, wherein the threshold boundary is based upon a distance between the first tapping-point and the second tapping-point.

12. The system of claim 9, wherein each of the first tapping-point and the second tapping-point is associated with minimum and a maximum number of flops that can be wired to the respective tapping-point.

13. The system of claim 9, wherein the computer is further configured to:
determine, based upon the plurality of device records of the netlist file, a first distance between the first clock-gater and the first tapping-point;
determine, based upon the plurality of device records of the netlist file, a second distance between the first clock-gater and the second tapping-point; and
in response to determining that the first force value exceeds the second force value and that the first distance exceeds the second distance:
generate, in the netlist file, a device record of a cloned first clock-gater identical to the first clock-gater;
update, in the netlist file, the device records of the first subset of flops and the cloned first clock-gater indicating that the first subset of flops is wired to the first tapping-point via the cloned first clock-gater; and
in response to determining that the first force value exceeds the second force value and that the second distance exceeds the first distance:
update, in the netlist file, the device record of the first subset of flops indicating that the first subset of flops is wired to the first tapping-point via the first clock-gater;
in response to determining that the second force value exceeds the first force value and that the second distance exceeds the first distance:
generate, in the netlist file, a device record of a cloned first clock-gater identical to the first clock-gater;
update, in the netlist file, the device records of the first subset of flops and the cloned first clock-gater indicating that the first subset of flops is wired to the second tapping-point via the cloned first clock-gater; and
in response to determining that the second force value exceeds the first force value that the first distance exceeds the second distance:
update, in the netlist file, the device record of the first subset of flops indicating that the first subset of flops is wired to the second tapping-point via the first clock-gater.

14. The system of claim 13, wherein the computer is further configured to:
in response to determining that a difference between a number of flops wired to the first tapping-point via the first clock-gater and the number of flops wired to the second tapping-point via the cloned first clock-gater is greater than a threshold value:
update, in the netlist file, the device record of each of the flops wired to the cloned first clock-gater indicating that each of the flops is no longer wired to the cloned first clock-gater and is wired to the first clock-gater; and delete, in the netlist file, the device record of the cloned first clock-gater.

15. The system of claim 13, wherein the computer is further programmed to:

in response to determining that a difference between a number of flops wired to the second tapping-point via the cloned first clock-gater and the number of flops wired to the first tapping-point via the first clock-gater is greater than a threshold value:

update, in the netlist file, the device record of each of the flops wired to the first clock-gater indicating that each of the flops is no longer wired to the first clock-gater and is wired to the cloned first clock-gater; and delete, in the netlist file, the device record of the first clock-gater.

16. The system of claim 9, wherein the plurality of clock-gaters are arranged in a hierarchical clock-gater tree structure, and wherein the first clock-gater comprises a logic gate selected from the group consisting of: a multiplexer, an AND gate, an OR gate, a NOT gate, a NAND gate, a NOR gate, an XOR gate, an inverter, and a buffer.

17. A computer-implemented method comprising:

receiving, by a computer, a netlist file comprising a plurality of records of a plurality of devices for a circuit design, the plurality of devices comprising a plurality of flops and a plurality of tapping-points;

identifying, by the computer, in the netlist file, a first flop and a first set of one or more tapping-points within a threshold distance from the first flop;

determining, by the computer, a respective force value between the first flop and each of the tapping-points in the first set of one or more tapping-points, wherein the respective force value is based upon a distance from the first flop to the respective tapping-point indicated by the netlist file, and a number of flops wired to the respective tapping-point indicated by the netlist file;

in response to the computer determining that the first flop has the greatest force with a first tapping-point in the first set of one or more tapping-points:

updating, by the computer, in the netlist file, a device record of the first flop, the device record indicating the first flop is wired to the first tapping-point; and causing, by the computer, a fabrication of an integrated circuit using the updated netlist file.

18. The method of claim 17, wherein the threshold distance is selected such that the first set of one or more tapping-points includes each of the plurality of tapping-points.

19. The method of claim 17, wherein each of the tapping-points is a node of a clock-tree driven by a global clock signal, and wherein the clock-tree has a structure selected from the group consisting of: a symmetric H-tree, a non-symmetric H-tree, a general clock-tree, a fishbone clock-network, a clock-mesh, and a partial clock-mesh.

20. The method of claim 17, further comprising:

updating, by the computer, a graphical user interface (GUI), based upon the update to the netlist file.

* * * * *